June 3, 1969   E. STEINGROEVER   3,447,842
DIAMAGNETIC BODY
Filed Oct. 20, 1965

United States Patent Office 3,447,842
Patented June 3, 1969

3,447,842
DIAMAGNETIC BODY
Erich Steingroever, Bonn, Germany, assignor to Magnetfabrik Bonn GmbH., vorm. Gewerkschaft, Windhorst, Bonn, Germany
Filed Oct. 20, 1965, Ser. No. 498,542
Claims priority, application Germany, Oct. 30, 1964,
M 62,945
Int. Cl. F16c 35/00, 39/06
U.S. Cl. 308—10     7 Claims

ABSTRACT OF THE DISCLOSURE

A magnetic suspension system for a rotatable armature wherein the armature is attached to a ring of diamagnetic material disposed in an air gap between the poles of an annular magnetic field with the diamagnetic material composed of anisotropic crystals being magnetically oriented.

---

This invention relates to diamagnetic bodies useful in free suspension systems, i.e., in systems where an object is maintained in stabilized suspension in a magnetic field without mechanical means of support.

It is known that diamagnetic bodies are capable of floating freely in a static magnetic field in a stable equilibrium (W. Braunbeck Z. Fur Physik, 1939, pp. 753–769). Suitable materials having high negative susceptibility are carbon and bismuth. It has also been proposed to construct a rotary system for electricity counters in such a way that a main portion of the weight is supported by the repelling force of a stationary permanent magnet or one or more magnets carried by said rotary system; a small portion of the weight is carried by a diamagnetic cylindrical ring which enters into the inhomogeneous field of the gap of another stationary magnet and serves as support for the shaft of the movable system. Furthermore, it has been proposed to use diamagnetic bodies as free floating movable armatures in counters for electricity, gases or liquids.

It is a principal object of the invention to provide a diamagnetic material of improved bearing and guiding properties which is suitable for use in floating suspensions of the type referred to hereinabove.

Other objects and advantages will become apparent from a consideration of the specification and claims, taken with the accompanying drawings wherein:

Figure 1:
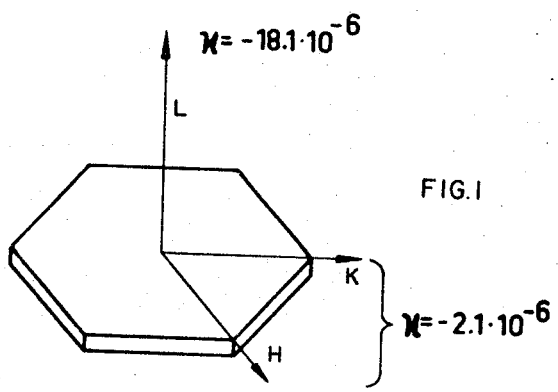
FIG. 1 is a perspective view of a hexagonal graphite crystal indicating the magnetic susceptibility measured in different directions.

I have found that the load bearing or centering properties of a diamagnetic body are substantially increased when such body consists of magnetically anisotropic particles. A suitable diamagnetic material is graphite which crystallizes in the hexagonal system. The relative magnetic susceptibility of graphite measured perpendicularly to the hexagonal axis is $-2.1 \cdot 10^{-6}$ (measuring directions H and K in FIG. 1), while measured in direction of the hexagonal axis it is $-18.1 \cdot 10^{-6}$ (measuring direction L in FIG. 1). With random distribution of the crystals, the susceptibility is about $-3.10^{-6}$.

Figure 2:
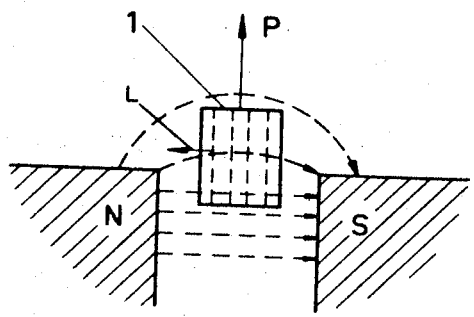
FIG. 2 shows the magnetic flux produced in an arrangement in accordance with the invention.

A diamagnetic graphite body 1 is shown in FIG. 2 in cross section. The crystals are so arranged that the hexagonal axis L coincides with the direction of the magnetic field inside the air gap; the field lines between the N and S poles are shown in broken lines. In the inhomogeneous part of the magnetic field, there is exerted on the body in direction of the arrow P a force which is proportional to the magnetic susceptibility. When all crystals are properly oriented, said force is about 6 times greater than for a random orientation of the crystals.

Figure 3:
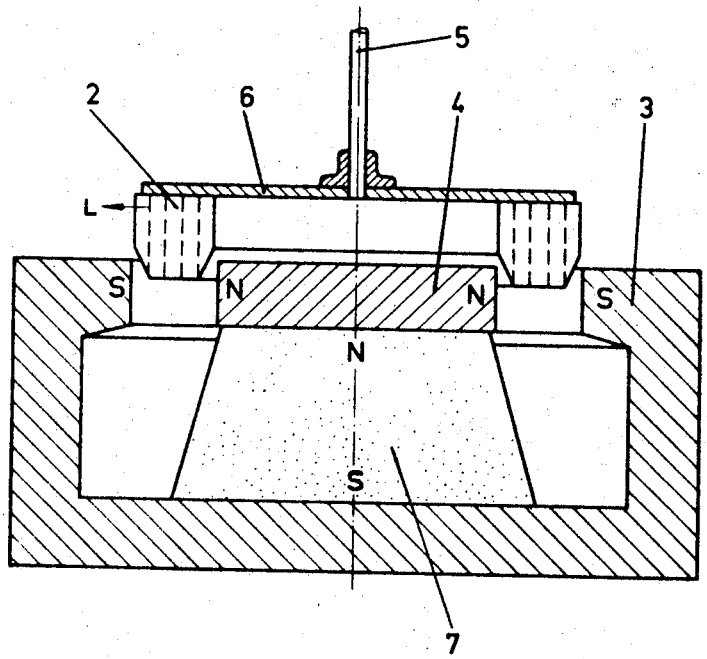
FIGS. 3 and 4 show two embodiments using a diamagnetic ring in accordance with the invention in floating magnetic bearings.

The freely suspended rotary system of a counter shown in FIG. 3 comprises a diamagnetic ring 2 of trapezoid cross section disposed in the inhomogeneous annular field of a permanent magnet system between the outer pole 3 and inner pole 4. The crystals are shown as viewed from the small side, the position of the hexagonal axis L being indicated for one crystal. The diamagnetic ring 2 is operatively connected to the shaft 5 of the rotary system by means of a non-magnetic disc 6 which is as light as possible. Said shaft 5 may drive a driving gear, counting or recording mechanism, or the like, and may be connected with a magnet system assisting in balancing the bearing load. The magnetic field is maintained by a permanent magnet 7, which can be replaced by an electromagnet.

Figure 4:
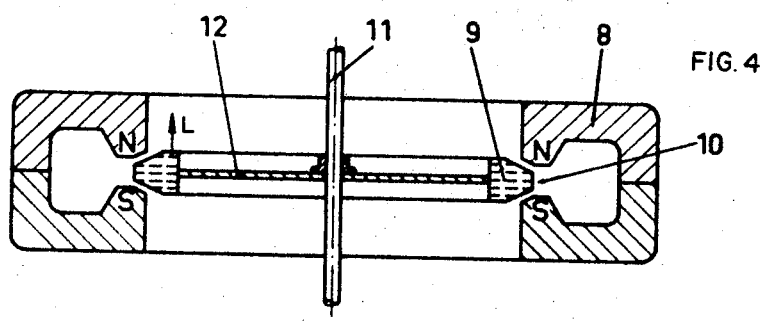

Another embodiment of the invention is shown in FIG. 4. There, a graphite ring 9 is placed in the inhomogeneous field of the magnet 8. Said ring 9 has a trapezoidally tapered outer rim facing the air gap 10. The crystals are again shown from their narrow side, and the direction of the hexagonal axes is shown at L. The ring is axially centered and also supported by the inhomogeneous magnetic field and itself supports and centers the shaft 11 to which it is mechanically connected by the disc 12.

The anisotropic diamagnetic bodies of my invention can be prepared in various ways. A disc or ring as shown in FIG. 4 can be, for instance, cut from a natural large graphite mono-crystal (Ceylon graphite), with due attention to the position of the hexagonal axis. In another procedure, a graphite layer can be deposited on a commercial graphite plate by chemical decomposition of a hydrocarbon such as methane, whereby such graphite is precipitated in form of superposed layers of crystal platelets whose hexagonal axis lies normally to the carrier plate. The laminated precipitate can be worked up to a ring like ring 12 of FIG. 4.

A diamagnetic body according to FIG. 3, in which the L-axes of the crystals are oriented radially, can be built up from individual segments cut from pieces made as set forth hereinabove. However, such a ring can also be compressed in a strong magnetic field applied in the direction of the applied pressure, from a monocrystalline graphite powder: Thereby it may be to advantage to admix non-magnetic binder to the graphite powder in order to increase the cohesion of the graphite particles. In such procedure, the particles become so oriented that their hexagonal axis is in the plane of the ring. The susceptibility, measured in the plane of the ring, assumes a higher value than in a ring with random orientation of the hexagonal axis. Such higher susceptibility provides for a correspondingly higher lifting force of the ring.

I claim:

1. A magnetic suspension unit comprising a pair of annular poles facing each other across an air gap and producing a magnetic field in and around said air gap, said field being at least in part inhomogenous, magnet means energizing said poles, a diamagnetic ring entering at least partially said inhomogenous field and being maintained in floating centered suspension by the magnetic repulsion exerted thereon, and said diamagnetic ring being composed of oriented graphite crystals having axes substantially following the direction of the magnetic flux in said air gap.

2. A magnetic suspension unit as claimed in claim 1 wherein said poles are disposed in a horizontal plane in radially spaced relationship.

3. A magnetic suspension unit as claimed in claim 2 wherein said ring has a quadrangular cross section and a downwardly tapering rim entering said air gap.

4. A magnetic suspension unit as claimed in claim 1 wherein said poles are disposed in a vertical plane in vertical spaced relationship.

5. A magnetic suspension unit as claimed in claim 4 wherein said ring has a quadrangular cross section and an outwardly tapering rim.

6. A magnet suspension unit as claimed in claim 1 wherein said magnet means is a permanent magnet.

7. A magnetic suspension unit as claimed in claim 1 wherein said magnet means is an electro-magnet.

References Cited

UNITED STATES PATENTS

| | | | |
|---|---|---|---|
| 2,436,939 | 3/1948 | Schug | 308—10 |
| 2,536,824 | 1/1951 | Sontheim | 308—10 |
| 3,243,143 | 3/1966 | Dickstein | 244—1 |
| 3,297,406 | 1/1962 | Diefendorf | 23—209.1 |

DAVID X. SLINEY, *Primary Examiner.*

U.S. Cl. X.R.

310—90